May 2, 1944. G. B. WADSWORTH 2,348,100
SPLICING DEVICE FOR ELECTRICAL CONDUCTORS
Filed Oct. 24, 1940

INVENTOR.
GEORGE B. WADSWORTH.
BY Allen & Allen
ATTORNEYS.

Patented May 2, 1944

2,348,100

UNITED STATES PATENT OFFICE 2,348,100

SPLICING DEVICE FOR ELECTRICAL CONDUCTORS

George E. Wadsworth, Erlanger, Ky.

Application October 24, 1940, Serial No. 362,635

4 Claims. (Cl. 174—84)

My invention relates to the provision of means for splicing conductive cables, and in particular such cables as are employed for high tension power transmission. As today employed, such cables usually comprise a straight steel core and wires forming a stranded aluminum conductor twisted on the outside of the core. In the larger sizes these cables sometimes have a stranded steel core. It will be apparent to the skilled worker in the art that the device of my invention is not limited to the particular material of the cables or conductors. Those cables which I have just described are the ones at present in current use, it being found that they have suitable conductivity and suitable strength, resistance to fatigue, crystallization, and corrosion, and that they are capable of being given a long span between the steel supporting towers, making for economy of installation.

Hitherto the problem of making splices in these cables has been an exceedingly difficult one requiring special structures and many manipulations and giving great chance of failure. The problem is multifold. In the first place, the splice structure must not be of undue weight though a slight mass is not a disadvantage if it is of such character that it can act as damping means to minimize sway and vibration. The problem is also one of strength because the splice must at least be as strong as the cable itself. The problem again is one of conductivity along with strength, for the characteristics of the cable are carefully calculated in the light of the electrical load which it is designed to bear and a splice structure which has greater resistance than the resistance of the same length of cable is likely to cause difficulty due to heating and to be subject to deterioration from a number of causes, which causes however are accelerated by heating at the splice. The problem is also one of protecting the cable in the spliced portion from corrosive influences due to weather conditions. The bare cable after having been wet will rapidly and thoroughly dry so that corrosion of the conductive strands or of the core is minimized. But where a cable is engaged in a clamp or sleeve device, moisture may very readily be able to permeate it by capillarity, but is prevented from drying or is entrapped in cavities. Corrosion is thus permitted to continue over a long period of time; and in certain structures the accumulation of ice may lead to mechanical as well as corrosive difficulties.

The primary objects of my invention are the solution of these problems and the provision of a relatively simple, quite inexpensive, durable and thoroughly reliable splicing means which nevertheless can be readily applied and handled in the field and without special tools.

In particular it is my object to provide a standardized inexpensive structure by which a splice can quickly be made in the field, the structure being simple in formation and use, strong mechanically, capable of making adequate contact with the primary conductive portion of the cable, and having a total resistance at least as low as and preferably lower than a similar length of cable, and capable of being rapidly and inexpensively treated so as to protect both the cable and the structure itself from corrosive influences and the expanding effect of ice.

These and other objects of my invention which will be set forth hereinafter or will be apparent to one skilled in the art upon reading this specification, I accomplish by that certain construction and arrangement of parts of which I shall hereinafter describe an exemplary embodiment. Reference is made to the drawing wherein.

In the practice of my invention, I provide a primary gripping means designed to engage and hold the ends of the core member of the cable, the ends being bared through the stripping away from them of the outer conductive strands of the cable at the time of the formation of the splice. The gripping means is so made as to be easily applied but to have a gripping strength equal to the full strength of the core. I also employ a sheath or housing having a central cavity to accept the gripping means aforesaid and end portions designed to grip or clamp unstripped portions of the cable. The structure of these clamping portions is such as not only to clamp the conductive portions of the cable so strongly that these portions will break elsewhere rather than pull out of the clamp, but is also so designed as to make contact with the conductive portions in the cable in such a way as to provide an electrical bridge for the splice, which bridge will have at least as low a resistance as the same length of unspliced cable. The sheath or housing is further so constructed that it may be filled up internally with a protective compound which, surrounding the first mentioned gripping means, will protect it from corrosion, and permeating the cable, will seal the engaged portions thereof against the entrance of moisture without interfering with electrical conductivity.

Figures 5, 8:
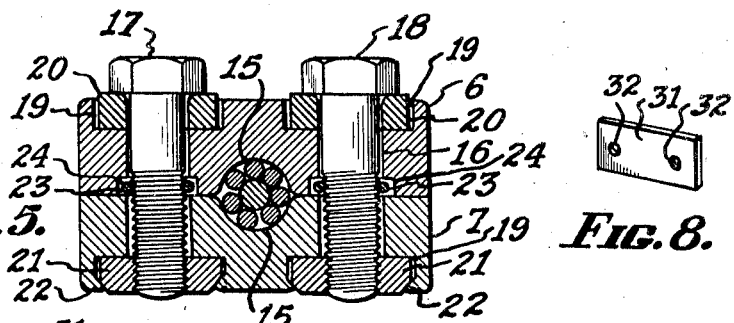
Fig. 5 is a sectional view through an end of the structure, taken along the lines 5—5 of Fig. 4.
Fig. 8 is a detail perspective view of a lamina such as are used in the device of Fig. 7.

In the several figures I have illustrated a cable having a straight steel core 1 and outlying twisted aluminum wires 2 forming the primary conductive part of the cable. My splicing means comprises sheath or housing members 6 and 7 and interior gripping means 8 and 9. In making the splice the procedure is first to bare the core of the cable as at 1a and then engage the bared ends in the gripping means 8—9. The gripping means have corrugated meeting surfaces as indicated at 10, slightly grooved to receive the core. The member 9 is shown as having ears 11 at its ends between which a reduced portion 12 of the member 8 is received so as to assist in holding the gripping members in alignment. The members are held together by a series of bolts 13. In the form illustrated, the action of the jaws is such as to grip the cable cores firmly (one of the cores lying on each side of the line of bolts 13), the cores being forced into a corrugated formation by the corrugated character of the jaws of the gripping means. The gripping means are nevertheless small in size as will be evident, though making engagement between the core ends, which engagement will be stronger than the strength of the cores themselves. The gripping means may, if desired, be made of ordinary iron or steel or cast iron, or may be made of bronze or indeed any metal having sufficient hardness and strength. The important factor in connection with the gripping means is that the steel core wires be tightly clinched to resist tensile stresses. This can be accomplished in a variety of ways. One modification is shown in Figs. 7 and 8, where the gripping means comprises a band like member 30 within which are provided a plurality of laminae 31 having two holes 32 therethrough. One of the steel wires 1 passes through one series of holes 32, and the other passes through the other series of holes 32. Under the influence tension, the laminae 31 become cocked, as clearly shown in Fig. 7, each laminae exerting a clinching action on each core wire. The gripping means of Fig. 7 is of course enclosed in a sheath member according to Figs. 1–5. The conductivity of the gripping means is not of great importance for the current is bridged over the splice by the sheath means next to be described.

Figure 1:
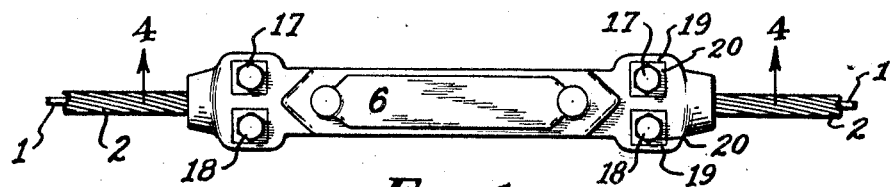
Figure 1 is a top view of an assembled splice structure.
Figure 2:
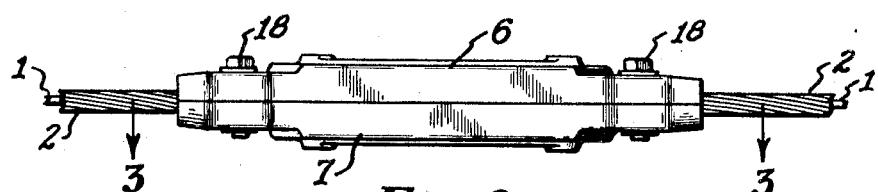
Fig. 2 is a side view thereof.
Figure 3:
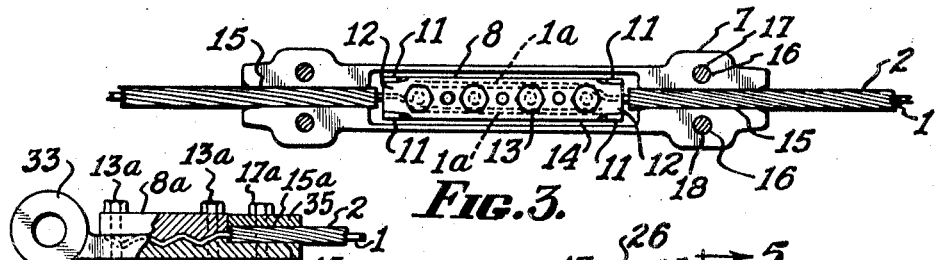
Fig. 3 is a plan view showing the action of the clamping means upon the core, one of the sheath members having been removed. This figure may be regarded as a sectional view taken along the line 3—3 of Fig. 2.
Figures 4, 6:
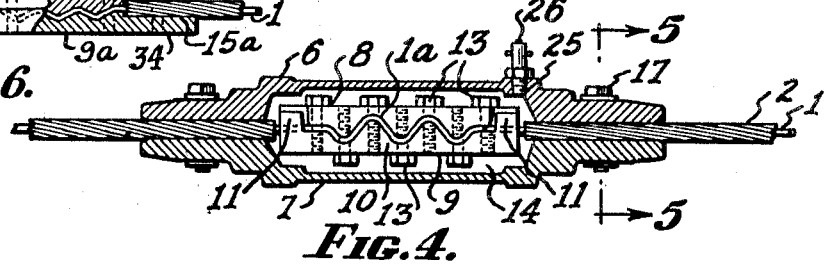
Fig. 4 is a vertical sectional view through the assembled structure taken along the line 4—4 of Fig. 1.
Fig. 6 is a partial sectional view of a dead end, embodying the principles of Figs. 1-5.
Figure 7:
Fig. 7 is a sectional view through a modified interior gripping means which may be used with the sheath members of Figs. 1-5.

The sheath means are in the form of a pair of elongated members 6 and 7 hollowed out internally as at 14 in Figs. 3 and 4. The members 6 and 7 when in engagement with the cable are designed to come together or substantially together. The ends of the members are somewhat enlarged and are made solid except that each is grooved as at 15 to accept the cable. It will be noted from Figs. 3 and 4 that while the cores only are engaged by the gripping means 8—9, the entire body of the cable is clamped between the ends of the sheath members.

As I have already explained, this clamping engagement must be such as to grip the conductive strands 2 firmly enough so that these strands will break rather than come out of the clamping engagement, and must also be such as to make adequate electrical connection to the conductive strands. The best way of accomplishing these objects, I have found, is to make the grooved portions 15 smooth on their interior rather than rough or toothed, and to ream them very carefully so that they engage the cable body accurately but with strong clamping pressure. The enlarged ends of the sheath containing the grooves 15 are made of such length as to give adequate electrical contact as well as clamping pressure and for the usual cable the length of the grooves should not be less than say one and one-half inches.

The sheath members 6 and 7, for lightness, are preferably made of the materials similar to the conductive strands 2, namely aluminum or an alloy of aluminum with silicon in minor amounts. The enlarged ends of the sheath are perforated as at 16 for the acceptance of a pair of bolts 17, 18. I prefer to provide sockets 19 in the ends of the sheath members. These sockets in the sheath member 6 carry sleeves or washers 20 upon which the heads of the bolts 17, 18 can bear; and in the sheath member 7 these sockets contain threaded nuts 21 which may be held in the sockets by peening as at 22. The sockets, of course, are so shaped as to prevent the rotation of the nuts. In order to prevent loss of the bolts, each bolt may be equipped with a spring ring 23 to hold it in the member 6; and the inside surface of the member 6 may be grooved as at 24 to accommodate this spring ring.

In using my structure for forming a splice the operator first strips the end of the cable by removing the conductive strands 2 from the core 1, as will be clear from Figs. 3 and 4. Then the core ends are engaged in the clamping or gripping means 8—9 as already described. Then the interior cavity 14 of each of the sheath members 6—7 may be filled with a sealing compound such as putty, and the sheath members placed over the cable ends and gripping means 8—9. The ends of the conductive strands 2 may also, if desired, be painted with some sealing substance, such for example, as red lead, or a bitumen, or the like. The sheath members are then engaged as will be clear from Figs. 4 and 5 and the bolts 17—18 tightened. The structure is such that the combined sheath will furnish both the electrical connection and the splicing connection between the strands 2 of each cable end, these strands being so firmly engaged and clamped in the grooves 15 that the strands will break before pulling out, and so firmly engaged over so great an area as to insure adequate electrical contact. With adequate electrical contact assured, the electrical mass of the sheath members may be such as to give to the combined splice structure an electrical resistance as low as and preferably lower than the electrical conductivity of the same length of unspliced cable.

Where it is not desired to place a sealing composition in the cavity of the sheath members before assembly, I may drill and tap the body of one of the sheath members as at 25 to accept a fitting 26 which may be and preferably is a standard pressure lubrication fitting, such as a so-called Alemite fitting. Where this is done, the splice may be made without the use of sealing compound, and sealing compound thereafter introduced into the cavity 14 under pressure in such a way as to fill the cavity and permeate the ends of the cable which lie in the grooved portions 15.

In Fig. 6 I have shown the invention as applied to a so-called "dead end." Two inner gripping means 8a and 9a are provided, and these are substantially like the gripping means 8 and 9, except that the member 9a is provided with a dead eye 33, and is extended at 34 to provide a groove 15a similar to the groove 15. A separate clamping element 35 is provided to have a complementary groove 15a. The grooves 15a cooperate as in Figs. 1–5 to grip the complete conductor tightly without crushing the strands 2. The bolts 13a and 17a correspond in function to the bolts 13 and 17.

Modifications may be made in my invention without departing from the spirit of it. Having thus described my invention, what I claim as new and desire to secure by Letters Patent is:

1. In a splicing device for conductive cable comprising a tensile core and outlying conductive strands wound thereon, a pair of conductive sheath members of elongated bar-like form and of substantially constant width, said sheath members at their ends being shaped to conform exteriorly to said cable and to effect clamping engagement therewith, said sheath members being hollowed out intermediate their ends to form a housing for independent gripping means engaging stripped portions of said core, the ends of said sheath members being grooved to accept said cable, the groove when the members are in clamping engagement presenting an accurate perforation to accept the cable, the said perforation being of smaller diameter than the outside diameter of the cable whereby the conductive cable members will be compressed, and the said engagement grooves being of sufficient length to insure low resistance, electrical contact with said conductive members, the said sheath members having bodily an electrical resistance at least as low as the electrical resistance of the cable, and being made of a material of a class consisting of aluminum or an alloy of aluminum with silicon in minor amounts, and independent gripping means housable within said cavity for engaging stripped ends of the cable core, said gripping means comprising opposed corrugated jaws and bolt means for holding said jaws together in gripping engagement with said stripped core portions.

2. In a splicing means of the character described a sheath member comprising a bar-like body of substantially constant width centrally hollowed on one side to form a cavity, the ends of said body being perforated for the acceptance of a pair of interspaced bolts at each end, the said ends also being grooved for the acceptance of a cable, the grooved portions being in length not less than one-half the length of the said cavity, the said body being of a material of a class consisting of aluminum or an alloy of aluminum with silicon in minor amounts, and being further characterized at its ends by sockets, which sockets carry bearing means for said bolts, said bearing means being of harder metal.

3. In a splicing means of the character described a sheath member comprising a bar-like body of substantially constant width centrally hollowed on one side to form a cavity, the ends of said body being perforated for the acceptance of a pair of interspaced bolts at each end, the said ends also being grooved for the acceptance of a cable, the grooved portions being in length not less than one-half the length of the said cavity, the said body being of a material of a class consisting of aluminum or an alloy of aluminum with silicon in minor amounts, and being further characterized at its ends by sockets, which sockets carry bearing means for said bolts, said bearing means being of harder metal, and bolts passing through the ends of said sheath member and having their heads bearing against said bearing members, said bolts being retained in position by a spring clip, the face of said sheath member being grooved to accept said clip.

4. In a splicing means of the character described a sheath member comprising a bar-like body of substantially constant width centrally hollowed on one side to form a cavity, the ends of said body being perforated for the acceptance of a pair of interspaced bolts at each end, the said ends also being grooved for the acceptance of a cable, the grooved portions being in length not less than one-half the length of the said cavity, the said body being of a material of a class consisting of aluminum or an alloy of aluminum with silicon in minor amounts, and being further characterized at its ends by sockets, which sockets carry bearing means for said bolts, said bearing means being of harder metal, the said bearing member being a nut, and the said nut being held in said socket by a peened portion of the body of said sheath.

GEORGE B. WADSWORTH.